(12) United States Patent
Sugimoto

(10) Patent No.: US 11,703,003 B2
(45) Date of Patent: Jul. 18, 2023

(54) MISFIRE DETECTION DEVICE FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/548,659

(22) Filed: Dec. 13, 2021

(65) Prior Publication Data

US 2022/0243674 A1   Aug. 4, 2022

(30) Foreign Application Priority Data

Jan. 29, 2021   (JP) .............................. JP2021-012554

(51) Int. Cl.
*F02D 41/00* (2006.01)
*F02D 41/02* (2006.01)
*G01M 15/11* (2006.01)
*F02D 41/14* (2006.01)

(52) U.S. Cl.
CPC ..... *F02D 41/0087* (2013.01); *F02D 41/0097* (2013.01); *F02D 41/029* (2013.01); *F02D 41/1475* (2013.01); *G01M 15/11* (2013.01); *F02D 2200/0812* (2013.01); *F02D 2200/1012* (2013.01); *F02D 2200/1015* (2013.01)

(58) Field of Classification Search
CPC ............. F02D 41/0087; F02D 41/0097; F02D 41/029; F02D 41/1475; F02D 2200/0812; F02D 2200/1012; F02D 2200/1015; G01M 15/11
See application file for complete search history.

(56) References Cited

U.S. PATENT DOCUMENTS

| 2008/0098806 A1* | 5/2008 | Shikama | F02D 41/0097 73/114.25 |
| 2013/0312504 A1* | 11/2013 | Bowman | F02D 41/0097 73/114.05 |
| 2014/0261309 A1* | 9/2014 | Chen | F02D 17/00 123/320 |
| 2017/0350333 A1* | 12/2017 | Glugla | F02D 35/0015 |
| 2019/0234323 A1* | 8/2019 | Weber | F01L 13/0036 |

FOREIGN PATENT DOCUMENTS

| JP | 2013-108485 A | 6/2013 | |
| JP | 2018127969 A | * 8/2018 | |
| WO | WO-2015194342 A1 | * 12/2015 | ............. F02D 41/12 |

* cited by examiner

*Primary Examiner* — Joseph J Dallo
(74) *Attorney, Agent, or Firm* — Finnegan, Henderson, Farabow, Garrett & Dunner, LLP

(57) ABSTRACT

A CPU stops combustion control of Cylinder #1 in order to perform a regeneration process of a GPF and performs a regeneration process of causing an air-fuel ratio of an air-fuel mixture in Cylinders #2 to #4 to be richer. When it is determined that a misfire has occurred because a misfire rate when the regeneration process is not being performed is equal to or greater than a predetermined value, the CPU determines that an internal combustion engine has returned to a normal state based on the premise that the misfire rate when the regeneration process is not being performed decreases.

7 Claims, 5 Drawing Sheets

MISFIRE DETECTION DEVICE FOR INTERNAL COMBUSTION ENGINE

CROSS-REFERENCE TO RELATED APPLICATION

This application claims priority to Japanese Patent Application No. 2021-012554 filed on Jan. 29, 2021, incorporated herein by reference in its entirety.

BACKGROUND

1. Technical Field

The present disclosure relates to a misfire detection device for an internal combustion engine

2. Description of Related Art

For example, a misfire detection device that is applied to an internal combustion engine including a port injection valve that injects fuel into an intake port and a cylinder injection valve that injects fuel into a combustion chamber is described in Japanese Unexamined Patent Application Publication No. 2013-108485 (JP 2013-108485 A). This device determines that the internal combustion engine has returned to a normal state due to a decrease of a misfire rate at the time of injection of fuel from the port injection valve when it has been determined that a misfire has occurred because the misfire rate at the time of injection of awl from the port injection valve has increased.

SUMMARY

The inventor investigated supplying unused fuel and oxygen to exhaust gas by stopping combustion control in only some cylinders and setting an air-fuel ratio of the other cylinders to be richer than a stoichiometric air-fuel ratio in order to perform a regeneration process of the exhaust gas in a post-processing device when an output torque of an internal combustion engine is not zero. In this case, after a misfire has been determined when the regeneration process is not being performed, determination accuracy for returning to a normal state may be decreased due to execution of the regeneration process. That is, when periodic torque fluctuation is generated by a torque miss due to stop of the combustion control and the torque fluctuation overlaps the torque miss due to a misfire, rotational fluctuation at the time of occurrence of the misfire decreases. Accordingly, when it is determined whether a misfire has occurred based on the magnitude of the rotational fluctuation, the accuracy of determination may decrease.

Operations and advantages of configurations of the present disclosure for solving the aforementioned problem will be described below:

(1) According to an aspect of the present disclosure, there is provided a misfire detection device for an internal combustion engine, the misfire detection device being applied to an internal combustion engine including a plurality of cylinders, the misfire detection device being configured to perform: a stopping process of stopping combustion control of an air-fuel mixture in some cylinders out of the plurality of cylinders; a temporary determination process of temporarily determining whether a misfire has occurred based on a magnitude of an amount of rotational fluctuation of a crank shaft; a regular determination process of regularly determining that a misfire has occurred when a proportion at which it has been temporarily determined that a misfire has occurred is equal to or greater than a predetermined proportion; and a return determination process of determining that the internal combustion engine has returned to a normal state when the proportion at which it has been temporarily determined that a misfire has occurred is equal to or less than a prescribed proportion after the regular determination has been performed, wherein the amount of rotational fluctuation is a rate of change of an instantaneous speed variable, the instantaneous speed variable is a variable indicating a speed when the crank shaft rotates, and the return determination process is a process of not adding a result of the temporary determination process in a period in which the stopping process is being performed to an input for determining that the internal combustion engine has returned to the normal state when it is regularly determined m the regular determination process that a misfire has occurred based on the result of the temporary determination in a period in which the stopping process is not being performed.

With this configuration, when it is regularly determined thin a misfire has occurred in the period in which the stopping process is not being performed, it is determined whether the internal combustion engine has returned to a normal state based on the determination result of the temporary determination process when the stopping process is not being performed. When a misfire occurs while the stopping process is being performed and torque fluctuation due to the stopping process and a torque miss due to a misfire overlap, the magnitude of the amount of rotational fluctuation decreases and it may be erroneously temporarily determined that a misfire has not occurred even if a misfire has occurred. On the other hand, with this configuration, since it is determined whether the internal combustion engine has returned to the normal state without using the determination result of the temporary determination process when the stopping process is being performed, it is possible to accurately determine whether the internal combustion engine has returned to the normal state.

(2) In the misfire detection device for an internal combustion engine according to (1), the misfire detection device may be configured to further perform a storage process of storing a designation variable for designating the determination result of the temporary determination process which is added to the input of the return determination process based on a state when it has been regularly determined that a misfire has occurred, the designation variable may be a variable for designating the determination result of the temporary determination process in a period in which the stopping process is not being performed when a period in which the temporary determination process of which the determination result is input to the regular determination process has been performed is a period in which the stopping process is not being performed and designating the determination result of the temporary determination process in a period in which the stopping process is being performed when the period in which the temporary determination process of which the determination result is input to the regular determination process has been performed is included in the period in which the stopping process is being performed, and the return determination process may be a process of determining that the internal combustion engine has returned to the normal state based on the determination result of the temporary determination process designated by the designation variable.

With this configuration, the determination result of the temporary determination process in a state similar to the state in which the regular determination process has been performed can be designated as an input of the return determination process using the designation variable.

(3) In the misfire detection device for an internal combustion engine according to (1) or (2), the misfire detection device may be configured to further perform a storage process of storing a designation variable for designating the determination result of the temporary determination process which is added to the input of the return determination process based on a state when it has been regularly determined that a misfire has occurred, the regular determination process may be a process of regularly determining that a misfire has occurred based on the determination result of the temporary determination process in a predetermined period, and the designation variable may be a variable for designating the determination result of the temporary determination process in a period in which the stopping process is not being performed when it has been regularly determined that a misfire has occurred because a proportion at which the temporary determination process has been performed in the predetermined period including both a period in which the stopping process is being performed and a period in which the stopping process is not being performed is equal to or greater than the predetermined proportion and a proportion at which the temporary determination process has been performed in the period in which the stopping process is not being performed out of the number of times the temporary determination process has been performed is equal to or greater than the predetermined proportion.

With this configuration, a period which can be considered to be a period in which the stopping process is not being performed can be defined using the predetermined proportion.

(4) In the misfire detection device for an internal combustion engine according to (1) or (2), the misfire detection device may be configured to further perform a storage process of storing a designation variable for designating the determination result of the temporary determination process which is added to the input of the return determination process based on a state when it has been regularly determined that a misfire has occurred, the regular determination process may be a process of regularly determining that a misfire has occurred based on the determination result of the temporary determination process in a predetermined period, and the designation variable may be a variable for designating the determination result of the temporary determination process in a period in which the stopping process is being performed when it has been regularly determined that a misfire has occurred because a proportion at which the temporary determination process has been performed in the period in which the stopping process is being performed out of the number of times the temporary determination process has been performed is equal to or greater than the predetermined proportion.

With this configuration, a period which can be considered to be a period in which the stopping process is being performed can be defined using the predetermined proportion.

(5) In the misfire detection device for an internal combustion engine according to (1) or (2), the misfire detection device may be configured to further perform a storage process of storing a designation variable for designating the determination result of the temporary determination process which is added to the input of the return determination process based on a state when it has been regularly determined that a misfire has occurred, the regular determination process may be a process of regularly determining that a misfire has occurred based on the determination result of the temporary determination process in a predetermined period, and the designation variable may be a variable for designating the determination result of the temporary determination process in both a period in which the stopping process is not being performed and a period in which the stopping process is being performed when it has been regularly determined that a misfire has occurred because a proportion at which the temporary determination process has been performed in the predetermined period including both the period in which the stopping process is being performed and the period in which the stopping process is not being performed is equal to or greater than the predetermined proportion and both a proportion at which the temporary determination process has been performed in the period in which the stopping process is not being performed out of the number of times the temporary determination process has been performed and a proportion at which the temporary determination process has been performed in the period in which the stopping process is being performed are less than the predetermined proportion.

When the proportion at which the temporary determination process has been performed when it has been regularly determined that a misfire has occurred does not greatly depend on whether the stopping process is being performed or not, it is thought that the reason for the misfire is less correlated with whether the stopping process is being performed or not. Therefore, with this configuration, when the correlation therebetween is low, a misfire rate based on the determination result of the temporary determination process decreases regardless of whether the stopping process is being performed or not and thus it is determined that the internal combustion engine has returned to the normal state. Accordingly, it is possible to more rapidly determine whether the internal combustion engine has returned to the normal state.

(6) In the misfire detection device for an internal combustion engine according to any one of (2) to (5), the designation variable may designate the same subarea as a subarea in which it has been regularly determined that a misfire has occurred out of a plurality of subareas into which an area is divided by at least one of a filling efficiency of the internal combustion engine, a rotation speed of a crank shaft, and a temperature of the internal combustion engine.

With this configuration, by designating the same subarea as a subarea in which the regular determination process has been performed out of a plurality of subareas into which an area is divided by at least one of the three variables, it is possible to determine whether the internal combustion engine has returned to the normal state in a state similar to the state in which the regular determination process has been performed in comparison with a case in which such a subarea is not designated.

(7) In the misfire detection device for an internal combustion engine according to any one of (2) to (6), the internal combustion engine may include a filter that collects particulate matter in exhaust gas in an exhaust passage, and the misfire detection device may be configured to further perform a regeneration process including a process of causing an air-fuel ratio in a cylinder other than the some cylinders to be richer than a stoichiometric air-fuel ratio and the stopping process when an amount of particulate matter collected by the filter is equal to or greater than a predetermined amount.

With this configuration, unused fuel can be made to flow to the exhaust passage by setting the air-fuel ratio of the air-fuel mixture in a cylinder other than the some cylinders to be richer than the stoichiometric air-fuel ratio through the regeneration process. Since the unused fuel is oxidized with oxygen flowing from the some cylinders to the exhaust passage, it is possible to heat the filter. Since the air-fuel ratio of the air-fuel mixture is determined based on a temperature increase request for the filter at the time of performing the regeneration process in this way, the air-fuel ratio of the air-fuel mixture tends to be different from that when the regeneration process is not being performed. This means that a combustion state of the air-fuel mixture is different. Accordingly, it is particularly effective to designate whether the stopping process is being performed or not using the designation variable.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
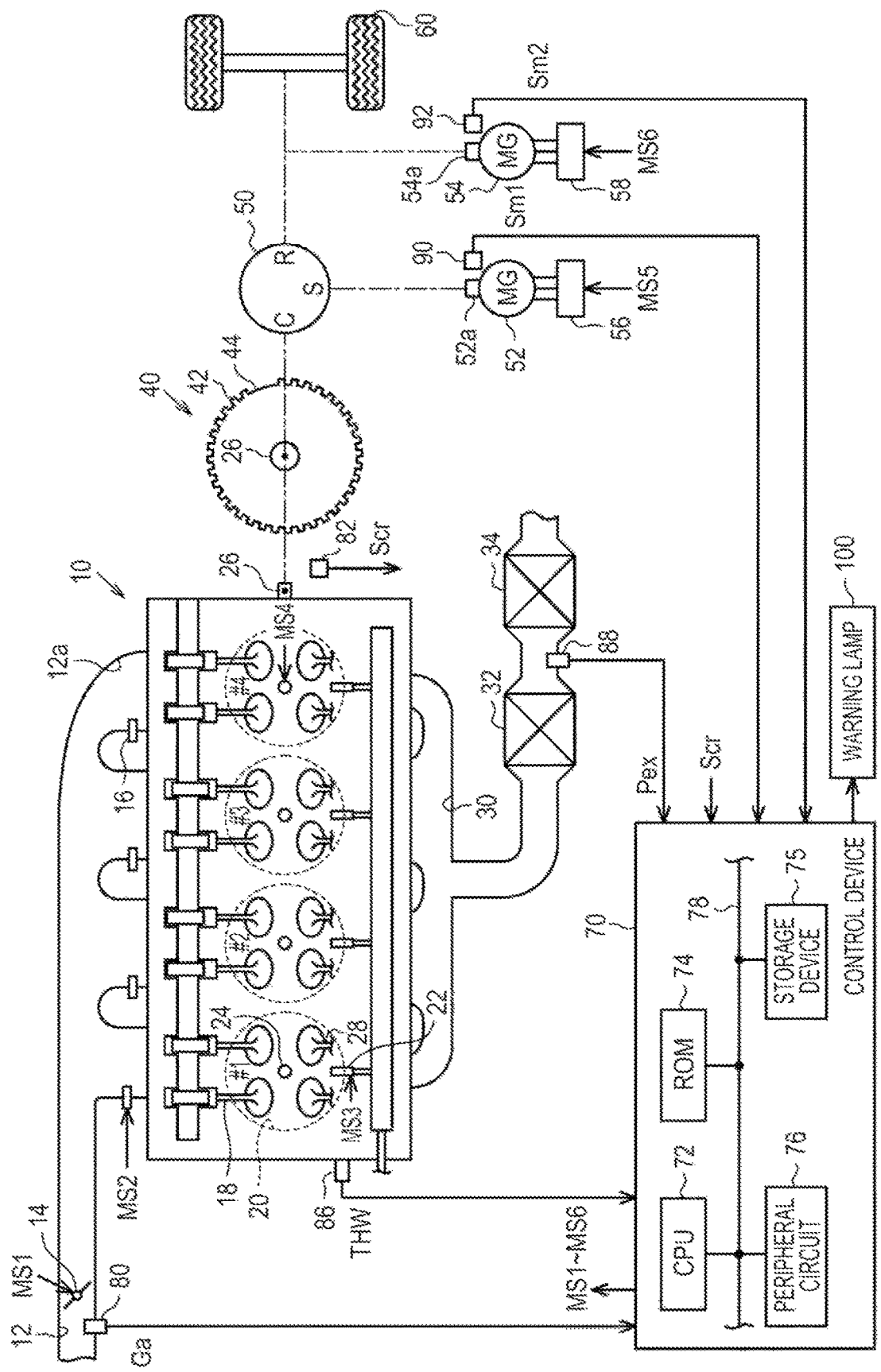
FIG. 1 is a diagram illustrating configurations of a drive system and a control 1 device for a vehicle according to an embodiment.

Hereinafter, a first embodiment of the present disclosure will be described with reference to the accompanying drawings. As illustrated in FIG. 1, an internal combustion engine 10 includes cylinders #1 to #4. A throttle valve 14 is provided in an intake passage 12 of the internal combustion engine 10. A port injection valve 16 that injects fuel into an intake port 12a is provided in the intake port 12a which is located downstream in the intake passage 12. Air taken into the intake passage 12 and fuel injected from the port injection valve 16 flow into a combustion chamber 20 with opening of an intake valve 18. Fuel is injected into the combustion chamber 20 from a cylinder injection valve 22. The air-fuel mixture in the combustion chamber 20 is provided for combustion with spark discharge of an ignition plug 24. Combustion energy which is generated at that time is converted to rotational energy of a crank shaft 26.

The air-fuel mixture provided for combustion in the combustion chamber 20 is discharged as exhaust gas to an exhaust passage 30 by opening an exhaust valve 28. A three-way catalyst 32 having an oxygen storage capacity and a gasoline particulate filter (GPF) 34 are provided in the exhaust passage 30. In this embodiment, it is assumed that the GPF 34 has a configuration in which a three-way catalyst is carried in a filter that collects particulate matter (PM).

A crank rotor 40 having toothed portions 42 provided therein is coupled to the crank shaft 26. The toothed portions 42 represent a plurality of rotation angles of the crank shaft 26. Basically, the toothed portions 42 are provided at intervals of 10° C.A in the crank rotor 40, and one missing-tooth portion 44 which is a portion in which an interval of the neighboring toothed portions 42 is 30° C.A is provided. This is for representing a rotation angle serving as a reference of the crank shaft 26.

The crank shaft 26 is mechanically connected to a carrier C of a planetary gear mechanism 50 constituting a power split device. A rotation shaft 52a of a first motor generator 52 is mechanically connected to a sun gear S of the planetary gear mechanism 50. A rotation shaft 54a of a second motor generator 54 and driving wheels 60 are mechanically connected to a ring gear R of the planetary gear mechanism 50. An AC voltage is applied to a terminal of the first motor generator 52 by an inverter 56. An AC voltage is applied to a terminal of the second motor generator 54 by an inverter 58.

A control device 70 controls the internal combustion engine 10 and operates operation units of the internal combustion engine 10 such as the throttle salve 14, the port injection valve 16, the cylinder injection valve 22, and the ignition plug 24 such that a torque and an exhaust gas component proportion which are control parameters of the internal combustion engine 10 are controlled. The control device 70 also controls the first motor generator 52 and operates the inverter 56 such that a rotation speed which is a control parameter of the first motor generator 52 is controlled. The control device 70 also controls the second motor generator 54 and operates the inverter 58 such that a torque which is a control parameter of the second motor generator 54 is controlled. Operation signals MS1 to MS6 for the throttle valve 14, the port injection valve 16, the cylinder injection valve 22, the ignition plug 24, and the inverters 56 and 58 are illustrated in FIG. 1. The control device 70 controls the control parameters of the internal combustion engine 10 with reference to an amount of intake air Ga which is detected by an air flowmeter 80, an output signal Scr from a crank angle sensor 82, a coolant temperature THW which is detected by a coolant temperature sensor 86, and a pressure of exhaust gas Pex flowing into the GPF 34, which is detected by an exhaust pressure sensor 88. The control device 70 controls the control parameters of the first motor generator 52 or the second motor generator 54 with reference to an output signal Sm1 from a first rotation angle sensor 90 that detects a rotation angle of the first motor generator 52 and an output signal Snit from a second rotation angle sensor 92 that detects a rotation angle of the second motor generator 54.

The control device 70 includes a CPU 72, a ROM 74, a storage device 75, and a peripheral circuit 76, which are communicatively connected to each other via a communication line 78. Here, the peripheral circuit 7 includes a circuit that generates a clock signal for defining internal operations, a power supply circuit, and a reset circuit. The control device 70 controls the control parameters by causing the CPU 72 to execute a program stored in the ROM 74.

The control device 70 particularly performs a regeneration process of the GPF 34, a process associated with determination of a misfire, a process associated with determination of return to a normal state from a misfire, and a pre-process for determination of return to a normal state. A routine of these processes will be described below in detail.

"Regeneration Process for GPF 34"

Figure 2:
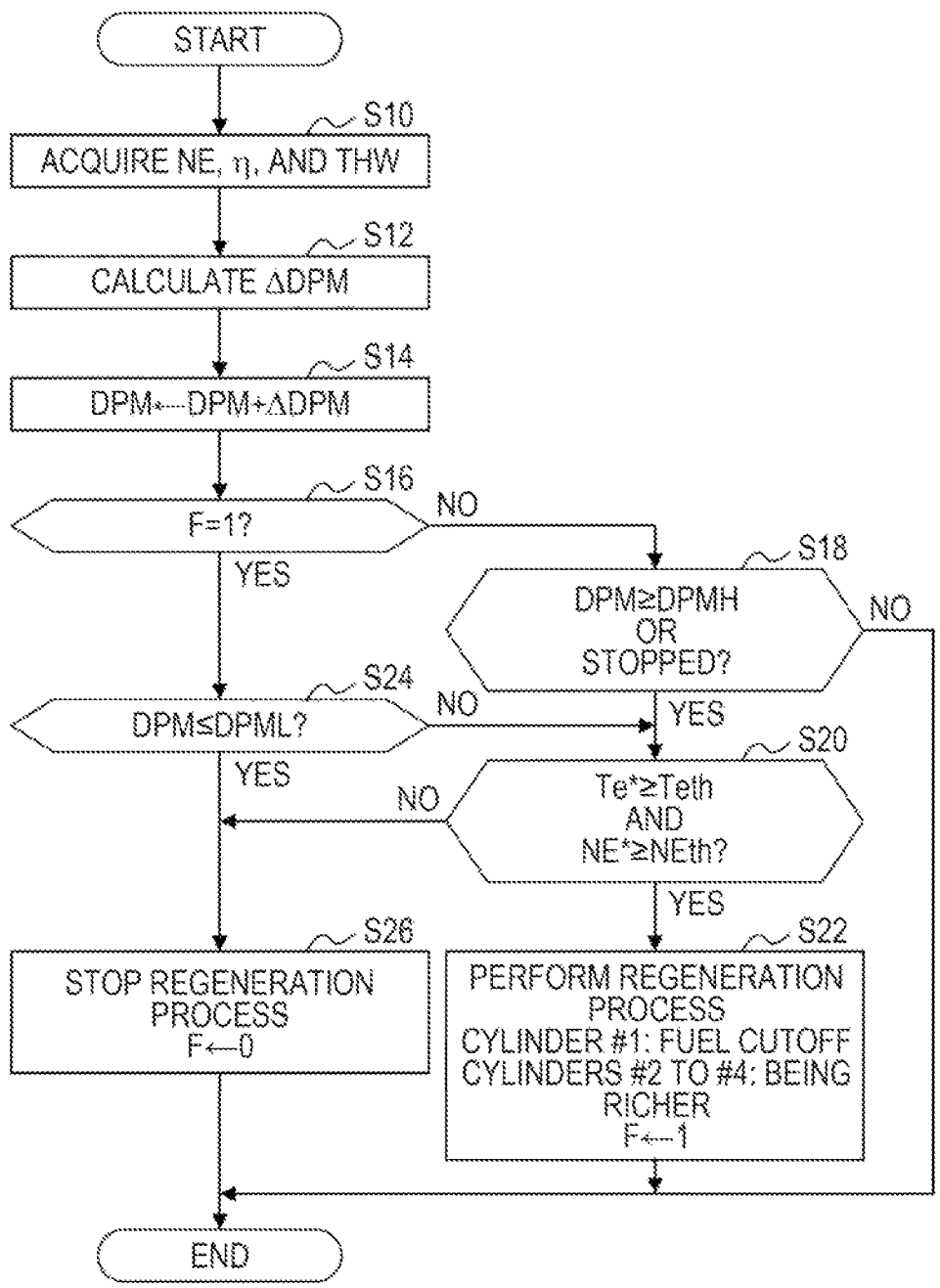
FIG. 2 is a flowchart illustrating a flow off GPF regenerating process according to the embodiment.

The routine illustrated FIG. 2 is realized by causing the CPU 72 to execute a program stored in the ROM 74, for example, repeatedly at predetermined intervals. Step numbers of the processes are expressed by numerals prefixed with "S" in the following description.

In a series of processes illustrated in FIG. 2, first, the CPU 72 acquires a rotation speed NE, a filling efficiency η, and a coolant temperature THW (S10). The rotation speed NE is calculated based on the output signal Scr by the CPU 72. The filling efficiency η is calculated based on an amount of intake air Ga and a rotation speed NE by the CPU 72. Then, the CPU 72 calculates an update amount ΔDPM of a deposition amount DPM based on the rotation speed NE, the filling efficiency η, and the coolant temperature THW (S12). Here, the deposition amount DPM is an amount of PM collected by the GPF 34. Specifically, the CPU 72 calculates an amount of PM in exhaust gas discharged to the exhaust passage 30 based on the rotation speed NE, the filling efficiency η, and the coolant temperature THW. The CPU 72 calculates the temperature of the GPF 34 based on the rotation speed NE and the filling efficiency η. Then, the CPU 72 calculates the update amount ΔDPM based on the amount of PM in exhaust gas and the temperature of the GPF 34. The CPU 72 can correct the update amount ΔDPM to decrease when the process of S22 which will be described later is performed.

Then, the CPU 72 updates the deposition amount DPM based on the update amount ΔDPM (S14). Then, the CPU 72 determines whether a flag F is "1" (S16). The flag F indicates that the regeneration process for combusting and removing PM of the GPF 34 is being performed when it is "1," and indicates otherwise when it is "0." When it is determined that the flag F is "0" (S16: NO), the CPU 72 determines whether a logical sum of a condition indicating that the deposition amount DPM is equal to or greater than a regenerative value DPMH and a condition indicating that the process of S22 which will be described later is stopped is true (S18). The regenerative value DPMH is set to a value with which the amount of PM collected by the GPF 34 is increased and the PM needs to be removed. When it is determined that the logical sum is true (S18: YES), the CPU 72 determines whether a logical product of Condition (a) and Condition (b) is true (S20). This process is a process of determining whether execution of the regeneration process is permitted.

Condition (a): A condition indicating that a required engine torque Te* which is a required torque for the internal combustion engine 10 is equal to or greater than a predetermined value Teth.

Condition (b): A condition indicating that the rotation speed command value NE* is equal to or greater than a predetermined speed NEth.

When it is determined that the logical product is true (S20: YES), the CPU 72 performs the regeneration process and substitutes "1" into the flag F (S22). That is, the CPU 72 stops injection of fuel from the port injection valve 16 and the cylinder injection valve 22 of Cylinder #1. The CPU 72 operates the port injection valve 16 and the cylinder injection valve 22 such that the air-fuel ratio of the air-fuel mixture in the combustion chambers 20 of Cylinders #2 to #4 is richer than the stoichiometric air-fuel ratio. This process is a process for discharging oxygen and unused feel to the exhaust passage 30 and increasing the temperature of the GPI 34 to combust and remove PM collected by the GPF 34. That is, the temperature of the exhaust gas can be increased and the temperature of the GPF 34 can also be increased by discharging oxygen and unused fuel to the exhaust passage 30 to combust unused fuel in the three way catalyst 32 or the like. The PM collected by GPF 34 can be combusted and removed by supplying oxygen to the GPF 34.

On the other hand, when it is determined that the flag F is "1" (S16: YES), the CPU 72 determines whether the deposition amount DPM is equal to or less than a stopping threshold value DPML (S24). The stopping threshold value DPML is set to a value at which the amount of PM collected by the GRP 34 is sufficiently small and the regeneration process can be stopped. When it is determined that the deposition amount DPM is greater than the stopping threshold value DPML (S24: NO), the CPU 72 causes the routine to proceed to S20. On the other hand, when the deposition amount DPM is equal to or less than the stopping threshold value DPML (S24: YES) and when the determination result of S20 is negative, the CPU 72 stops the regeneration process and substitutes "0" into the flag F (S26).

When the processes of S22 and S26 are completed or when the determination result of S18 is negative, the CPU 72 temporarily ends the series of processes illustrated in FIG. 2.

"Process Associated with Determination of a Misfire"

Figure 3:
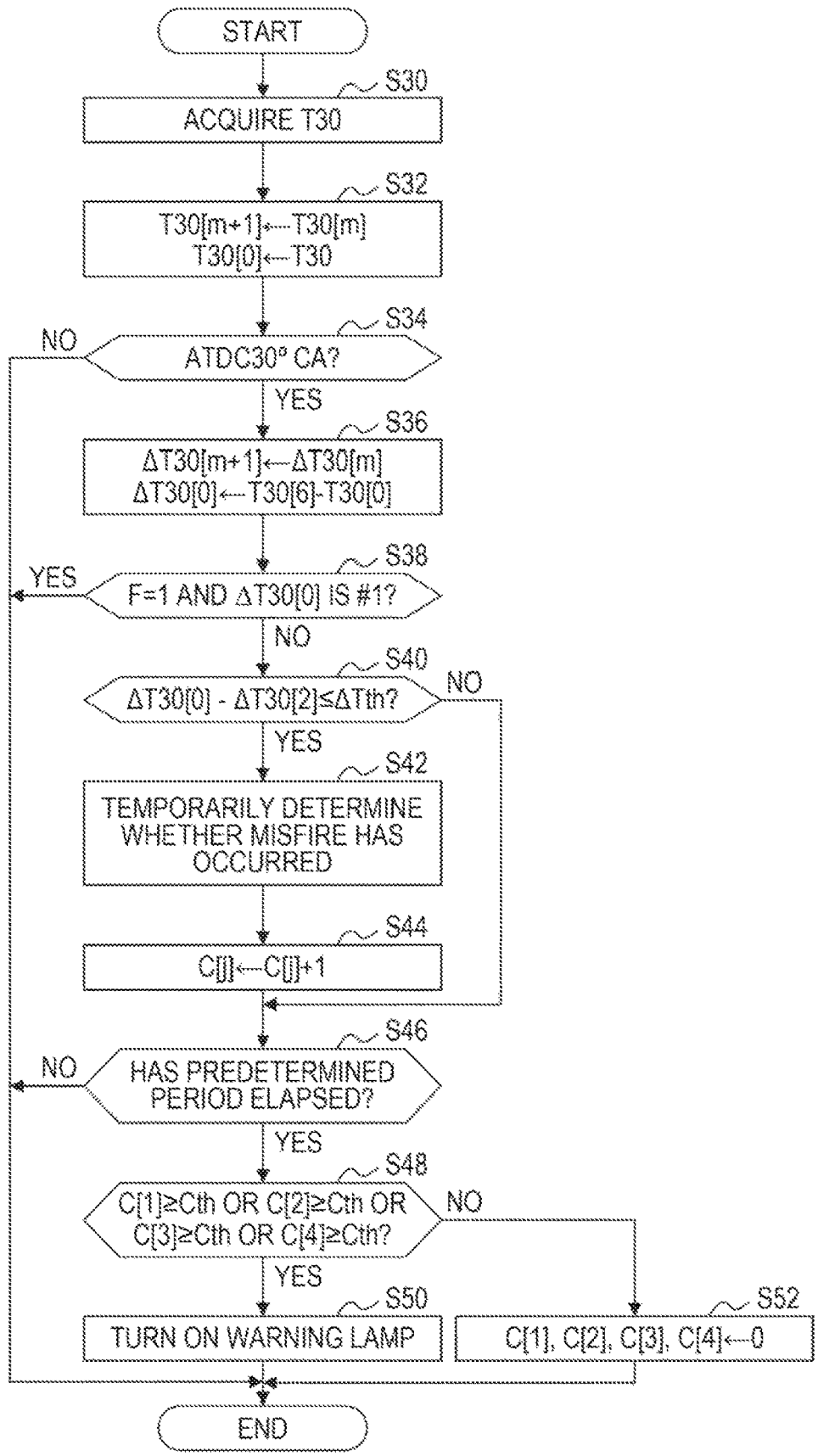
FIG. 3 is a flowchart illustrating a flow of a misfire determining process according to the embodiment.

The routine illustrated in FIG. 3 is realized by causing the CPU 72 to execute a program stored in the ROM 74, for example, repeatedly at intervals of a predetermined period.

In a series or processes illustrated in FIG. 3, first, the CPU 72 acquires a time T30 required for the crank shaft 26 to rotate by 30° C.A (S30). Here, the time T30 is calculated by counting a time until a toothed portion 42 sensed by the crank angle sensor 82 is switched to a toothed portion 42 separated 30° C.A based on the output signal Scr. Then, the CPU 72 substitutes the time T30[m] with the time T30[m+1], where "m=0, 1, 2, 3, . . . " is set, and substitutes the time T30 newly acquired in the process of S30 for the time T30[0] (S32). This process is a process for increasing the variable in the parentheses after the time T30 as it progresses deeper into the past. Through this process, the time T30 becomes 30° C.A ago when the variable in the parentheses increments by 1.

Then, the CPU 72 determines whether the current rotation angle of the crank shaft 26 is ATDC 30° C.A with respect to the compression top dead center of one of Cylinders #1 to #4 (S34). When it is determined that the rotation angle is ATDC 30° C.A (S34: YES), the CPU 72 substitutes a rotational fluctuation amount ΔT30[m] with a rotational fluctuation amount ΔT30[M+1] and substitutes a value obtained by subtracting the time T30[0] from the time T30[6] for the rotational fluctuation amount ΔT30[0] (S36). The rotational fluctuation amount ΔT30 is a variable which is about zero or a larger positive value when a misfire has not occurred in a cylinder in which it is determined whether a misfire has occurred and which is a negative value when a misfire has occurred. Here, the cylinder in which it is determined whether a misfire has occurred is a cylinder in which the compression top dead point appears 180° C.A before a cylinder which has been determined to pass the compression top dead center by 30° through the process of S34.

Then, the CPU 72 determines whether a logical product of a condition indicating that the flag F is "1" and a condition indicating that the rotational fluctuation amount ΔT30[0] calculated in the process of S16 is the rotational fluctuation amount ΔT30 of Cylinder #1 is true (S38). That is, the CPU 72 determines whether the compression top dead center of Cylinder #1 appears 210° C.A before a time point at which a positive determination result of S34 is acquired while the regeneration process is being performed. When it is determined that the logical product is false (S38: NO), the CPU 72 determines whether a value obtained by subtracting the rotational fluctuation amount ΔT30[2] from the rotational fluctuation amount ΔT30[0] is equal to of less than a threshold value ΔTth (S40).

This process is a process of determining whether a misfire has occurred in the cylinder to be determined. That is, when a misfire has not occurred, the rotational fluctuation amount ΔT30[0] and the rotational fluctuation amount ΔT30[2] have about the same value and thus a difference therebetween has a small absolute value. On the other hand, when a misfire has occurred in the cylinder to be determined, the rotational fluctuation amount ΔT30[0] has a negative value. On the other hand, when a misfire has not occurred in a cylinder in which the compression top dead center appears 360° C.A before the cylinder to be determined, the rotational fluctuation amount ΔT30[2] is about zero or a larger positive value. Accordingly, a value obtained by subtracting the rotational fluctuation amount ΔT30[2] from the rotational fluctuation amount ΔT30[0] is a negative value with a larger absolute value.

When it is determined that the value is equal to or less than the threshold value ΔTth (S40: YES), the CPU 72 temporarily determines that a misfire has occurred (S42). Then, the CPU 72 increments a counter C[j] corresponding to the cylinder number j to be determined out of Cylinders #1 to #4 (S44). The counter C[j] represents the number of times a misfire has occurred in Cylinder #j.

When the process of S44 has been completed or when the determination result of S40 is negative, the CPU 72 determines whether a predetermined period has elapsed from the later of a timing at which the process of S40 was first performed and a timing at which the process of S52 which will be described later was finally performed (S46). When it is determined that the predetermined period has elapsed (S46: YES), the CPU 72 determines whether at least one of the counters C[1], C[2], C[3], and C[4] is equal to or mater than a threshold value Cth (S48). The threshold value Cth is set based on a lower limit value of a misfire rate when a misfire has occurred at a non-ignorable misfire rate in the predetermined period.

When, it is determined that least one is equal to or greater than the threshold value Cth (S48: YES), the CPU 72 performs a notification process of notifying a user that it has been regularly determined that a misfire has occurred by operating a warning lamp 100 illustrated in FIG. 1 (S50). The regular determination indicating that a misfire has occurred is determination indicating that the misfire rate in one cylinder is a non-ignorable level. On the other hand, when it is determined that all of the counters C[1], C[2], C[3], and C[4] are less than the threshold value Cth (S48: NO), the CPU 72 initializes the counters C[1], C[2], C[3], and C[4] (S52).

When the processes of S50 and S52 have been completed, the determination results of S34 and S46 are negative, and the determination result of S38 is positive, the CPU 72 temporarily ends the series of processes illustrated in FIG. 3.

"Pre-Process for Determination of Return to Normality"

Figure 4:
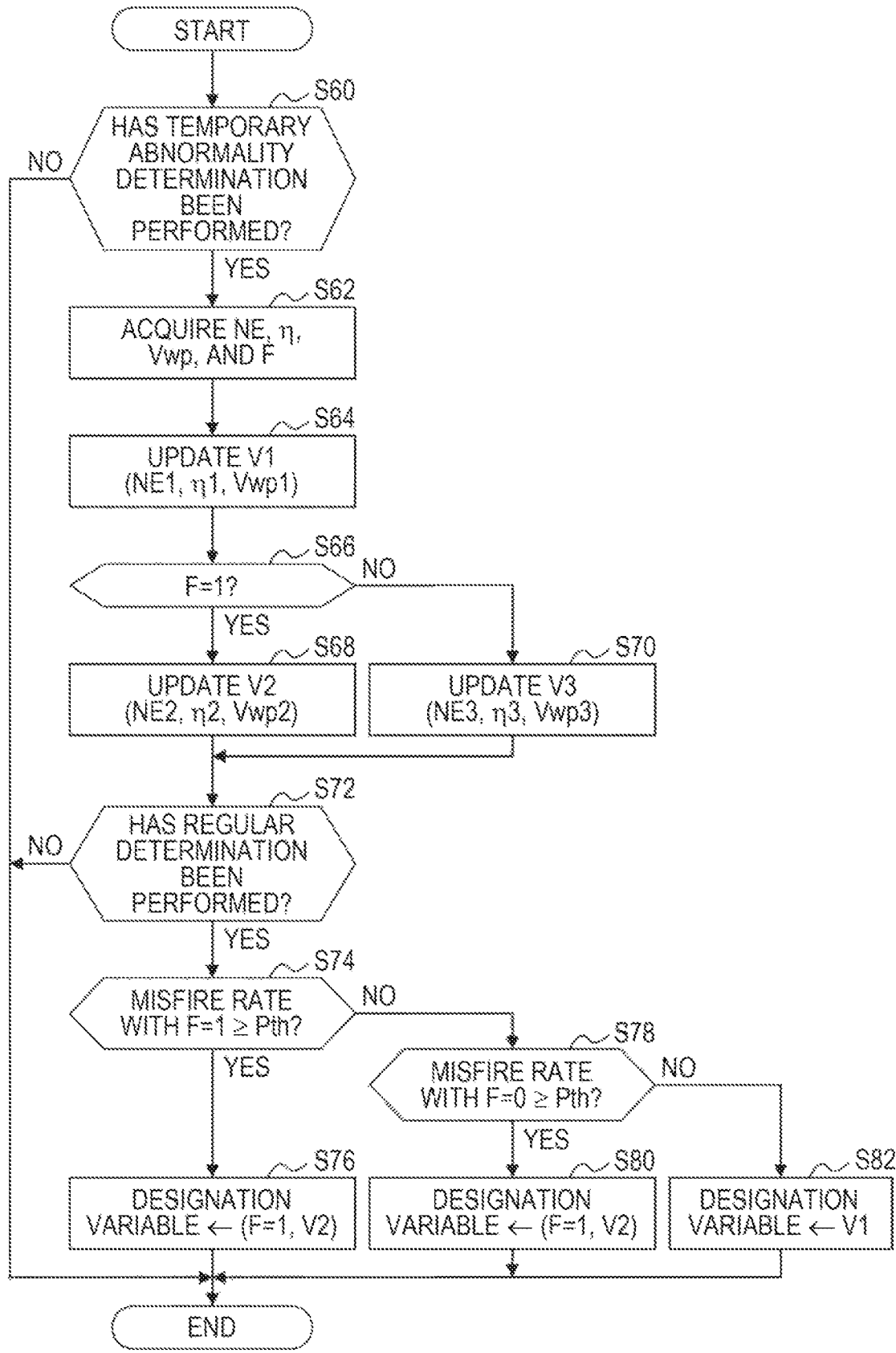
FIG. 4 is a flowchart illustrating a flow of a pre-process for normal return determination according to the embodiment.

The routine illustrated in FIG. 4 is realized by causing the CPU 72 to execute a program stored in the ROM 74, for example, repeatedly at intervals of a predetermined period.

In a series of processes illustrated in FIG. 4, the CPU 72 determines whether temporary abnormality determination has been performed (S60). In other words, the CPU 72 determines whether the determination result of S40 is positive. When it is determined that temporary abnormality determination has been performed (S60: YES), the CPU 72 acquires a rotation speed NE, the filling efficiency η, a warm-up variable Vwp, and the value of the flag F (S62). Here, the warm-up variable Vwp is "1" when warm-up of the internal combustion engine 10 has been completed and is "0" when the warm-up has not been completed. The CPU 72 can determine that the warm-up has been completed, for example, when the coolant temperature THW is equal to or higher than a predetermined temperature.

Then, the CPU 72 updates a first state variable vector V1 based on the values of the variables acquired in the process of S62 (S64). The first state variable vector V1 includes a first rotation speed NE1, a first filling efficiency η1, and a first warm-up variable Vwp1. The CPU 72 sets the first rotation speed NE1 to a moving average value of the rotation speed NE acquired in the process of S62. The CPU 72 sets the first filling efficiency η1 to a moving average value of the filling efficiency η acquired in the process of S62. The CPU 72 sets the first warm-up variable Vwp1 to "0" when the value of the warm-up variable Vwp acquired in the process of S62 has been ever "0" in the same trip. On the other hand, the CPU 72 sets the first warm-up variable Vwp1 to "0" when the warm-up variable Vwp acquired in the process of S62 is maintained at "1" in the same trip. A trip is defined as a period in which a travel permission signal of a vehicle is in an ON state. The travel permission signal may be, for example, a signal for switching to a state in which electric power can be supplied to the inverters 56 and 58 in a hybrid vehicle as in this embodiment. In addition, in case of a vehicle using only the internal combustion engine as an onboard motor, the travel permission signal is an ignition signal or the like.

Then, the CPU 72 determines whether the flag F is "1" (S66). When it is determined that the flag F is "1" (S66: YES), the CPU 72 updates a second state variable vector V2 (S68). The second state variable vector V2 includes a second rotation speed NE2, a second filling efficiency η2, and a second warm-up variable Vwp2. The CPU 72 sets the second rotation speed NE2 to a moving average value of values when the determination result of S66 is positive out of the rotation speeds NE acquired in the process of S62. The CPU 72 sets the second filling efficiency η2 to a moving average value of values when the determination result of S66 is positive out of the filling efficiency η acquired in the process of S62. The CPU 72 sets the second warm-up variable Vwp2 to "0" when the value when the determination result of S66 is positive out of the warm-up variables Vwp acquired in the process of S62 has been ever "0" in the same trip. On the other hand, the CPU 72 sets the second warm-up variable Vwp2 to "1" when all the values when the determination result of S66 is positive out of the warm-up variables Vwp acquired in the process of S62 are "1" in the same trip.

On the other hand, when it is determined that the flag F is "0" (S66: NO), the CPU 72 updates a third state variable vector V3 (S70). The third state variable vector V3 includes a third rotation speed NE3, a third filling efficiency η3, and a third warm-up variable Vwp3. The CPU 72 sets the third rotation speed NE3 to a moving average value of values when the determination result of S66 is negative out of the rotation speeds NE acquired in the process of S62. The CPU 72 sets the third filling efficiency η3 to a moving average value of values when the determination result of S66 is negative oat of the filling efficiency η acquired in the process of S62. The CPU 72 sets the third warm-up variable Vwp3 to "0" when the value when the determination result of S66 is negative out of the warm-up variables Vwp acquired in the process of S62 has been ever "0" in the same trip. On the other hand, the CPU 72 sets the third warm-up variable Vwp3 to "1" when all the values when the determination result of S66 is negative out of the warm-up variables Vwp acquired in the process of S62 are "1" in the same trip.

When the processes of S65 and S70 have been completed, the CPU 72 determines whether it has been regularly determined that a misfire has occurred (S72). In other words, the CPU 72 determines whether the determination result of S48 is positive. When it is determined that the regular determination has been performed (S72: YES), the CPU 72 determines whether a proportion of the number of times temporary determination for a misfire has been performed when the flag F is "1" with respect to the number of times temporary determination for a misfire has been performed in the predetermined period in which the regular determination has been performed is equal to or greater than a predetermined proportion Pth (S74). This process is a process of determining whether to perform determination of return to normality based on the misfire rate when the flag F is "1." The predetermined proportion Pth is set to a value which is less than "100%" and at which the regular determination indicating that a misfire has occurred can be considered to be substantially possible in a combustion state when the flag F is "1." When it is determined that the proportion is equal to or greater than the predetermined proportion Pth (S74: YES), the CPU 72 substitutes a value of a four-dimensional variable which is determined based on the premise that the flag F is "1" and the second state variable vector V2 into a designation variable and stores the value of the designation variable in the storage device 75 (S76). The designation variable is a variable for designating a state when determination of return to normality is performed.

On the other hand, when it is determined that the proportion of the number of times temporary determination for a misfire has been performed when the flag F is "1" is less than the predetermined proportion Pth (S74: NO), the CPU 72 determines whether the proportion of the number of times the temporary determination for a misfire has been performed when the flag F is "0" is equal to or greater than the predetermined proportion Pth (S78). This process is a process of determining whether to perform determination of return to normality based on the misfire rate when the flag F is "0." When it is determined that the proportion is equal to or greater than the predetermined proportion Pth (S78: YES), the CPU 72 substitutes a value of a four-dimensional variable which is determined based on the premise that the flag F is "0" and the third state variable vector V3 into a designation variable and stores the value of the designation variable in the storage device 75 (S80).

On the other hand, when it is determined that the proportion of the number of times temporary determination for a misfire has been performed when the flag F is "0" is less than the predetermined proportion Pth (S78: NO), the CPU 72 determines that there is a low correlation between the state in which a misfire has occurred and the value of the flag F and causes the routine to proceed to S82. In the process of S82, the CPU 72 substitutes a value of a three-dimensional variable which is determined based on the third state variable vector V3 into a designation variable and stores the value of the designation variable in the storage device 75. That is, in this case, the designation variable permits any of "0" and "1" as the value of the flag F. In other words, the designation variable designates any of "0" and "1" as the value of the flag F.

When the processes of S76, S80, and S82 have been completed or when the determination results of S60 and S72 are negative, the CPU 72 temporarily ends the series of processes illustrated in FIG. 4.

"Process for Determination of Return to Normality from Misfire"

Figure 5:
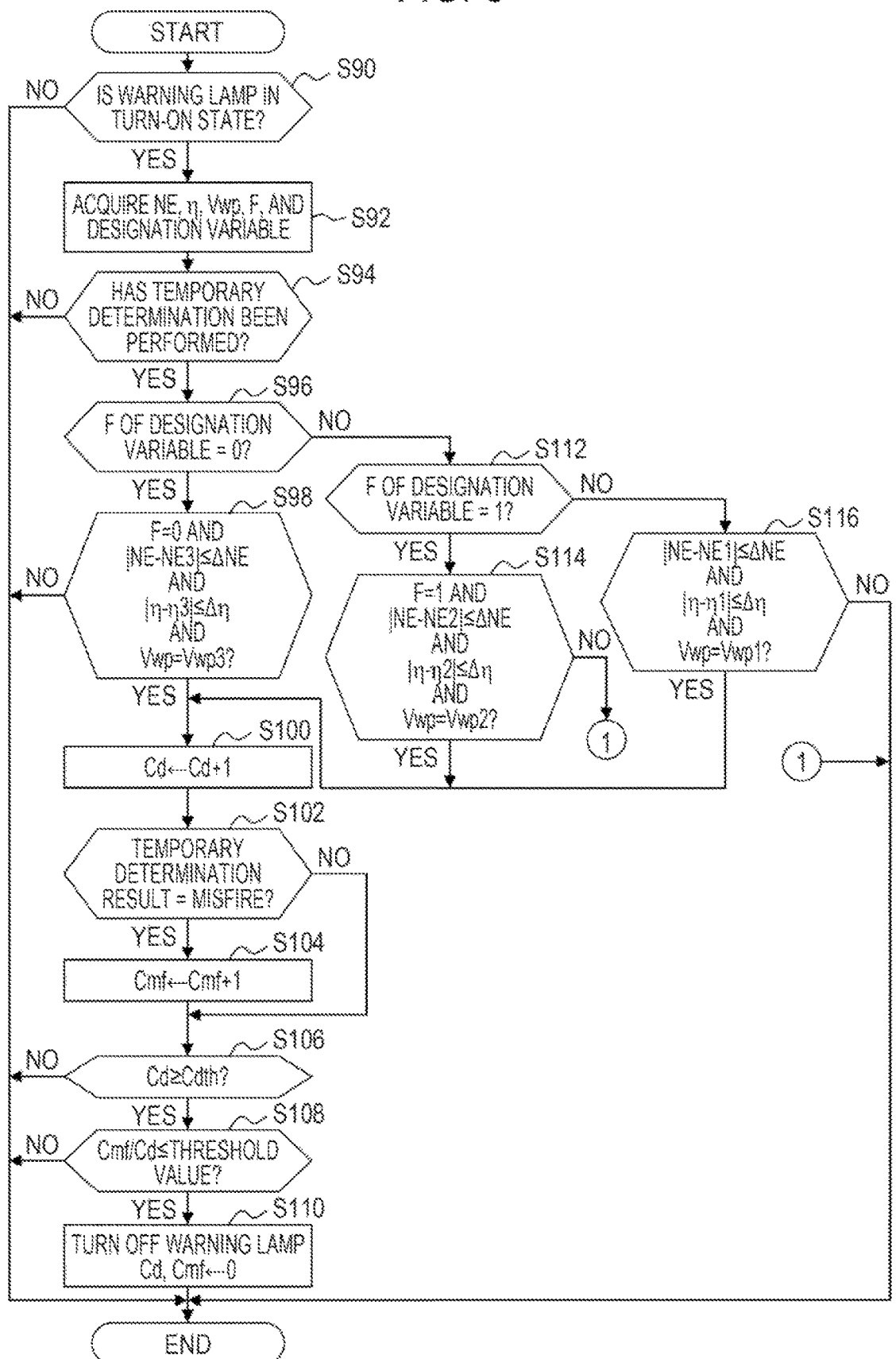
FIG. 5 is a flowchart illustrating a flow of a normal return determining process according to the embodiment.

The routine illustrated in FIG. 5 is realized by causing the CPU 72 to execute a program stored in the ROM 74, for example, repeatedly at intervals of a predetermined period.

In a series of processes illustrated in FIG. 5, the CPU 72 first determines whether a warning lamp 100 is in an ON state (S90). In other words, it is determined whether determination of return to normality has not been performed yet after it has been regularly determined that a misfire has occurred. When it is determined that the warning lamp 100 is in the ON state (S90: YES), the CPU 72 acquires a rotation speed NE, a filling efficiency η, a warm-up variable Vwp, a flag F, and a designation variable (S92). Here, the designation variable is set in one of three processes of S76, S80, and S82 in the routine illustrated in FIG. 4.

Then, the CPU 72 determines whether temporary determination has been performed (S94). In other words, it is determined whether the process of S40 has been performed. When it is determined that the process of S40 has been performed (S94: YES), the CPU 72 determines whether the flag indicated by the designation variable is "0" (S96). In other words, it is determined whether the designation variable has been set in the process of S80 illustrated in FIG. 4. When it is determined that the flag F indicated by the designation variable is "0" (S96: YES), the CPU 72 determines whether a logical product of following Conditions (A) to (D) is true (S98).

Condition (A): A condition indicating that the flag F acquired in the process of S92 is "0."

Condition (B): A condition indicating that an absolute value of a difference between the rotation speed NE acquired in the process of S92 and the third rotation speed NE3 is equal to or less than a prescribed speed ΔNE.

Condition (C): A condition indicating that an absolute value of a difference between the filling efficiency η acquired in the process of S92 and the third filling efficiency η3 is equal to or less than a prescribed efficiency ηn.

Condition (D): A condition indicating that the value of the warm-up variable Vwp is the same as the value of the third warm-up variable Vwp3.

The condition in which the logical product is true is a condition in which a state of the internal combustion engine 10 which is identified by the flag F, the rotation speed NE, the filling efficiency η, and the warm-up variable Vwp acquired in the process of S92 is similar to a state indicated by the designation variable acquired in the process of S92.

When it is determined that the logical product is true (S98: YES), the CPU 72 increments a counter Cd (S100). The CPU 72 determines whether a temporary determination result indicates that a misfire has occurred (S102). In other words, it is determined whether the determination result of S40 is positive. When it is determined that the temporary determination result indicates that a misfire has occurred (S102: YES), the CPU 72 increments a counter Cmf (S104).

When the process of S104 has been completed or when the determination result of S102 is negative, the CPU 72 determines whether the counter Cd is equal to or greater than a predetermined value Cdth (S106). The predetermined value Cdth is set to a value with which the number of sampled temporary determination results sufficient for determining return to a normal state can be secured. Then, when it is determined that the counter Cd is equal to or greater than the predetermined value Cdth (S106: YES), the CPU 72 determines whether a value obtained by dividing the value of the counter Cmf by the value of the counter Cd is equal to or less than a threshold value (S108). This process is a process of determining whether combustion has returned to a normal state in a state equivalent to an operation state of the internal combustion engine 10 when it has been regularly determined that a misfire has occurred. When the value is equal to or less than the threshold value (S108: YES), the CPU 72 tutus off the warning lamp 100 and initializes the counters Cd and Cmf (S110).

On the other hand, when it is determined that value of the flag F indicated by the designation variable is not "0" (S96: NO), the CPU 72 determines whether the value of the flag F indicated by the designation variable is "1" (S112). In other words, it is determined whether the designation variable has been set in the process of S76 illustrated in FIG. 4. When it is determined that the flag F indicated by the designation variable is "1" (S112: YES), the CPU 72 determines whether a logical product of following Conditions (E) to (H) is true (S114).

Condition (E): A condition indicating that the flag acquired in the process of S92 is "1."

Condition (F): A condition indicating that an absolute value of a difference between the rotation speed NE acquired in the process of S92 and the second rotation speed NE2 is equal to or less than a prescribed speed $\Delta NE$.

Condition (G): A condition indicating that an absolute value of a difference between the filling efficiency $\eta$ acquired in the process of S92 and the second filling efficiency $\eta 2$ is equal to or less than a prescribed efficiency $\Delta \eta$.

Condition (H) A condition indicating that the value of the warm-up variable Vwp is the same as the value of the second warm-up variable Vwp2.

The condition in which the logical product is true is a condition in which the state of the internal combustion engine 10 which is identified by the flag F, the rotation speed NE, the filling efficiency $\eta$, and the warm-up variable Vwp acquired in the process of S92 is similar to a state indicated by the designation variable acquired in the process of S92.

When it is determined that the logical product is true (S114: YES), the CPU 72 causes the routine to proceed to S100. When it is determined that the designation variable does not include the value of the flag F (S112: NO), that is, when it is determined that the designation variable has been set by the process of S82 illustrated in FIG. 4, the CPU 72 determines whether a logical product of following Conditions (I) to (K) is true (S116).

Condition (I): A condition indicating that an absolute value of a difference between the rotation speed NE acquired in the process of S92 and the first rotation speed NE1 is equal to or less than a prescribed speed $\Delta NE$.

Condition (J): A condition indicating that an absolute value of a difference between the filling efficiency $\eta$ acquired in the process of S92 and the first filling efficiency $\eta 1$ is equal to or less than a prescribed efficiency $\eta n$.

Condition (K): A condition indicating that the value of the warm-up variable Vwp is the same as the value of the first warm-up variable Vwp1.

The condition in which the logical product is true is a condition in which the state of the internal combustion engine 10 which is identified by the flag F, the rotation speed NE, the filling efficiency $\eta$, and the warm-up variable Vwp acquired in the process of S92 is similar to a state indicated by the designation variable acquired in the process of S92.

When it is determined that the logical product is true (S116: YES), the CPU 72 causes the routine to proceed to S100. When the process of S110 has been completed or when the determination results of S90, S94, S98, S106, S108, S114, and S116 are negative, the CPU 72 temporarily ends the series of processes illustrated in FIG. 5.

Operations and advantages in this embodiment will be described below. When it has been regularly determined that a misfire has occurred while the flag F is "0," the CPU 72 sets the value of the flag F indicated by the designation variable to "0." After the regular determination, based on the premise that the value of the flag F is "0." the number of times temporary determination has been performed is counted by the counter Cd and the number of times it has been temporarily determined that a misfire has occurred is counted by the counter Cmf. When the value of "Cmf/Cd" which is misfire rate in the state of the internal combustion engine 10 based on the premise that the value of the flag F is"0" is equal to or less than a threshold value, it is determined that internal combustion engine 10 has returned to a normal state. Accordingly, in comparison with a case in which the temporary determination result used to calculate the misfire rate includes the value when the value of the flag F is "1," it is possible to improve accuracy for determination of return to a normal state.

That is, when a misfire occurs while the value of the flag F is "1" and torque fluctuation due to the process of stopping combustion control and torque miss due to a misfire overlap, the magnitude of the rotational fluctuation amount $\Delta T30$ decreases. This may cause erroneous temporary determination indicating that a misfire has not occurred even if a misfire has occurred actually.

According to the aforementioned embodiment, the following operations and advantages can be achieved.

(1) When it has been regularly determined that a misfire has occurred while the flag F is "1," the CPU 72 sets the value of the flag F indicated by the designation variable to "1." Accordingly, after the regular determination based on the premise that the value of the flag F is "1," the number of times temporary determination has been performed can be counted by the counter Cd and the number of times it has been temporarily determined that a misfire has occurred can be counted by the counter Cmf. Accordingly, it is possible to determine whether the internal combustion engine has returned to the normal state from a state similar to the state when it has been regularly determined that a misfire has occurred.

Particularly, factors affecting the combustion state of an air-fuel mixture in the internal combustion engine 10 are markedly different between when the regeneration process is being performed and when the regeneration process is not being performed, and thus such settings are effective. That is, since the air-fuel ratios of air-fuel mixtures in Cylinders #2 to #4 are set to be rich through the regeneration process, the combustion state is different from a combustion state at a stoichiometric air-fuel ratio which is an air-fuel ratio of an air-fuel mixture when the regeneration process is not being performed.

For example, when a passage for causing some exhaust gas discharged to the exhaust passage 30 to flow to the intake passage 12 and a valve for adjusting an EGR amount which is an amount of exhaust gas flowing to the intake passage 12 are provided, there may be a request for decreasing the EGR amount in view of securement of temperature increase performance at the time of execution of the regeneration process. When the regeneration process is being performed and control for decreasing the EGR amount is performed in comparison with a case in which the regeneration process is not being performed, factors affecting the combustion state are markedly different depending on whether the regeneration process is being performed or not.

For example, when the regeneration process is being performed and an ignition timing is delayed in view of securement of temperature increase performance, factors affecting the combustion state are markedly different depending on whether the regeneration process is being performed or not.

In addition, according to a difference from the stoichiometric air-fuel ratio of an air-fuel mixture based on whether the regeneration process is being performed or where there is a temperature increase request, there is a motive for changing the following control based on whether the regeneration process being performed. An example of the control is control of an amount of fuel gas flowing from a combustion tank to the intake passage 12. Another example is control of valve characteristics such as a valve opening timing when a valve characteristic changing device that changes valve characteristics such as a valve opening time of the intake valve 18 is provided. Another example is control of a fuel injection timing.

(2) When the value of the flag F switched in a predetermined period and a proportion at which the value of the flag F is "0" with respect to the number of times it has been temporarily determined that a misfire has occurred in the predetermined period is equal to or greater than the predetermined proportion Pth, the CPU 72 sets the value of the flag F of the designation variable to "0." Accordingly, it is possible to define a period in which it can be considered to have regularly determined that a misfire has occurred when the regeneration process is not being performed.

(3) When the value of the flag F is switched in a predetermined period and a proportion at which the value of the flag F is a specific value with respect to the number of times it has been temporarily determined that a misfire has occurred in the predetermined period is less than the predetermined proportion Pth, the CPU 72 does not add the value of the flag F to the designation variable. Here, when the proportion at which the value of the flag F is a specific value is less than the predetermined proportion Pth, it is considered that the reason for a misfire has a low correlation with whether the regeneration process is being performed or not. Accordingly, since the combustion state is determined to have returned to the normal state because the misfire rate based on the determination result of the temporary determination process decreases regardless of whether the regeneration process is being performed, it is possible to more rapidly perform determination of return to the normal state.

(4) The total number of times the temporary determination has been performed when the state of the internal combustion engine 10 becomes similar to the state designated by the designation variable is counted by the counter Cd which is used to perform determination of return to the normal state. Accordingly, when the internal combustion engine 10 becomes the similar state intermittently, it is possible to rapidly perform determination of return to the normal state.

(5) The designation variable includes the filling efficiency η of the internal combustion engine 10, the rotation speed NE of the crank shaft 26, and a variable for designating the value of the warm-up variable Vwp. Accordingly, in comparison with a case in which the designation variable does not include them, it is possible to determine whether the internal combustion engine 10 has returned to the normal state when a degree of similarity to the state in which the regular determination has been performed is high.

Correspondence

The correspondence between the elements in the embodiment and the elements of the present disclosure described in the "SUMMARY" is as follows. In the following description, the correspondence is described for each number of the configurations described in the "SUMMARY." (1) The stopping, process corresponds to the process of S22. The temporary determination process corresponds to the process of S40. The regular determination process corresponds to the process of S46. The return determination process corresponds to the processes of S96 to S108 and the processes of S112 to S116. The rotational fluctuation amount corresponds to the rotational fluctuation amount ΔT30. The instantaneous speed variable corresponds to the time T30. The "process not including the determination result of the temporary determination process in the period in which the stopping process is being performed" corresponds to non-proceeding to the processes of S100 or steps subsequent thereto when the determination result of S98 is negative. (2) The storage process corresponds to the processes of S76, S80, and S82. (3) This configuration corresponds to a case in which the determination result of S78 is positive. The predetermined proportion corresponds to the predetermined proportion Pth. (4) This configuration corresponds to a case in which the determination result of S74 is positive. The predetermined proportion corresponds to the predetermined proportion Pth. (5) This configuration corresponds to a case in which the determination result of S78 is negative. (6) This configuration corresponds to a case in which the designation variable includes one of the first state variable vector V1, the second state variable vector V2, and the third state variable vector V3. (7) The regeneration process corresponds to the process of S22.

OTHER EMBODIMENTS

The aforementioned embodiment can be modified as follows. The aforementioned embodiment and the following modified examples can be combined unless technical conflictions arise.

"Designation Variable"

A variable indicating a load of the internal combustion engine 10 is not limited to the filling efficiency η. For example, the variable may be a required torque for the internal combustion engine 10.

The designation variable does not have to include the variable indicating the rotation speed of the crank shaft 26, the variable indicating the load, and the variable indicating the warm-up state. For example, the designation variable may include only two or only one of the three variables.

In the aforementioned embodiment, when both the period in which the regeneration process is being performed and the period in which the regeneration process is not being performed are included in the predetermined period, the designation variable designates that the value of the flag F is "0" when the proportion at which a misfire has occurred when the regeneration process is not being performed is equal to or greater than the predetermined proportion Pth, but the applicable embodiment is not limited. For example, when both the period in which the regeneration process is being performed and the period in which the regeneration process is not being performed are included in the predetermined period, the value of the flag F may not be designated by the designation variable. In other words, both of "1" and "0" may be designated as the value of the flag F.

For example, when both the period in which the regeneration process is being performed and the period in which the regeneration process is not being performed are included in the predetermined period, the designation variable may designate that the value of the flag F is "0."

"Instantaneous Speed Variable"

In the aforementioned embodiment, a crank angle area in which an instantaneous speed variable which is a variable indicating the rotation speed of the crank shalt 26 is defined in the crank angle area equal to or less than an interval between the compression top dead centers is set to 30° C.A, but the applicable embodiment is not limited thereto. For example, the crank angle area may be 10° C.A or may be the interval between the compression top dead centers.

The instantaneous speed variable is not limited to a quantity having the dimension of time, but may be, for example, a quantity having the dimension of speed.

"Rotational Fluctuation Amount"

In the aforementioned embodiment, the rotational fluctuation amount ΔT30 is defined as a difference between the instantaneous speed variables which are separated by a predetermined interval and the predetermine interval is set to 180° C.A, but the applicable embodiment is not limited thereto. For example, the predetermined interval may be set to 90° C.A or 120° C.A. It is preferable that the length of the predetermined interval be equal to or less than an appearance interval of the compression top dead center.

The rotational fluctuation amount is not limited to the difference between the instantaneous speed variables which are separated by the predetermined interval, and may be a ratio of the instantaneous speed variables which are separated by the predetermined interval.

"Temporary Determination Process"

In the aforementioned embodiment, whether the threshold value ΔTth is variable is not particularly described above, but the threshold value ΔTth may be set to be variable, for example, according to the rotation speed NE and the filling efficiency η. For example, when one of a pair of rotational fluctuation amounts ΔT30 is a quantity of Cylinder #1 while the flag F is "1," the threshold value ΔTth may be separately determined in consideration of the fact that the quantity corresponds to a misfire.

In the aforementioned embodiment, whether a misfire has occurred is determined based on a result of comparison between the difference between a pair of rotational fluctuation amounts ΔT30 separated by 360° C.A and a determination value, but the applicable embodiment is not limited thereto. For example, whether a misfire has occurred may be determined based on a result of comparison between the difference between a pair of rotational fluctuation amounts ΔT30 separated by 720° C.A and a determination value.

The method of comparing a relative magnitude difference between a pair of rotational fluctuation amounts ΔT30 with the determination value is not limited to comparison between the difference between a pair of rotational fluctuation amounts ΔT30 and the determination value, but may be comparison between a ratio between a pair of rotational fluctuation amounts ΔT30 and a determination value.

The comparison between a relative magnitude difference between a pair of rotational fluctuation amounts ΔT30 with the determination value is not necessarily performed. For example, through comparison between the rotational fluctuation amount ΔT30 and the determination value, it may be temporarily determined whether a misfire has occurred.

"Regular Determination Process"

The predetermined period in the process of S46 is not limited to a fixed value. For example, the predetermined period may be a period until the number of times the temporary determination process has been performed in the process of S40 reaches a predetermined number.

In the aforementioned embodiment, it is not particularly mentioned whether the threshold value Cth is a fixed value, but, for example, it is preferable that the threshold value Cth may be set to be variable according to the number of times the temporary determination process has been performed in the process of S40 when the predetermined period is a period until the appearance frequency of the compression top dead center reaches a predetermined number. Specifically, when the number of times the temporary determination process has been performed in the predetermined period is small, the threshold value Cth is preferably set to a smaller value than when the number of times the temporary determination process has been performed is large.

In the aforementioned embodiment, an example in which it is determined whether a consecutive misfire which is a misfire in which a misfire rate of a specific cylinder is greater than an allowable range in a predetermined period has occurred is described, but the applicable embodiment is not limited thereto. For example, a process of determining whether a random misfire which is a misfire in which a misfire frequency occurring in the predetermined period is greater than an allowable range has occurred may be performed.

"Predetermined Conditions for Permitting Execution of Regeneration Process"

The predetermined conditions for permitting execution of the regeneration process are not limited to the examples described in the aforementioned embodiment. For example, the predetermined conditions may include only one of Condition (a) and Condition (b). The predetermined conditions may include a condition other than the two conditions or may not include any of the two conditions.

"Stopping Process"

The stopping process is not limited to the regeneration process. For example, the stopping process may be a process of stopping supply of fuel to some cylinders in order to adjust the output power of the internal combustion engine 10. For example, the stopping process may be a process of stopping combustion control in a cylinder when an abnormality occurs in the cylinder. For example, the stopping process may be a process of performing control such that combustion control of one cylinder is stopped and the air-fuel ratio of an air-fuel mixture in the other cylinders is set to the stoichiometric air-fuel ratio when the oxygen storage capacity of the three-way catalyst 32 is equal to or less than a prescribed value.

"Reflection of Result of Regular Determination Indicating that Misfire has Occurred"

In the aforementioned embodiment, when it is regularly determined that a misfire has occurred, the notification process using the warning lamp 100 is performed, but the notification process is not limited to a process of operating a device that outputs visual information, but may be a process of operating, for example, a device that outputs auditory information.

The result of regular determination of a misfire does not have to be necessarily used for the notification process. For example, when it is regularly determined that a misfire has occurred, a process of operating an operation unit of the internal combustion engine 10 may be performed to change control of the internal combustion engine 10 to an operation state in which a misfire is not likely to occur. For example, the result of regular determination may be merely stored in the storage device 75. In this case, when it is determined that the internal combustion engine 10 has returned to the normal state, the result of regular determination stored in the storage device 75 can be deleted.

"Estimation of Deposition Amount"

The process of estimating the deposition amount DPM is not limited to the process illustrated in FIG. 2. For example, the deposition amount DPM may be estimated based on a difference in pressure between upstream and downstream of the GPF 34 and the amount of intake air Ga. Specifically, the deposition amount DPM can be estimated as a larger value when the different in pressure is great than when the difference in pressure is small, and the deposition amount DPM can be estimated as a larger value when the amount of intake air Ga is small than when the amount of intake air Ga is large even if the difference in pressure is the same. Here, when the pressure downstream from the GPF 34 is considered as a fixed value, the pressure of exhaust em Pex can be used instead of the difference in pressure.

"Post-Processing Device"

The GPF 34 is not limited to a filter carrying a three-way catalyst and may include only a filter. The GPF 34 is not limited to a position downstream from the three-way catalyst 32 in the exhaust passage 30. The post-processing device does not have to include the GPF 34 necessarily. For example, when the post-processing device includes only the three-way catalyst 32, it is effective to perform the processes described in the aforementioned embodiment or the modified examples thereof when it is necessary to increase the temperature of the post-processing device at the time of performing of the regeneration process.

"Control Device"

The control device is not limited to a control device including a CPU 72 and a ROM 74 and performing software processes. For example, a dedicated hardware circuit such as an ASIC that performs at least some of the software processes which have been performed in the aforementioned embodiment may be provided. That is, the control device may have at least one of the following configurations (a) to (c): (a) configuration in which a processor that performs all the processes in accordance with a program and a program storage device such as a ROM that stores the program are provided; (b) A configuration in which a processor that performs some of the processes in accordance with a program, a program storage device, and a dedicated hardware circuit that performs the other processes are provided; and (c) A configuration in which a dedicated hardware circuit that performs all the processes is provided. Here, the number of software executing devices including a processor and a program storage device or the number of dedicated hardware circuits may be two or more.

"Vehicle"

The vehicle is not limited to a series/parallel hybrid vehicle and, for example, a parallel hybrid vehicle or a series hybrid vehicle may be employed. Above all, the vehicle is not limited to a hybrid vehicle but may be, for example, a vehicle including only an internal combustion engine 10 as a power generator for the vehicle.

"Others"

In FIG. 4, the process of S78 is performed when the determination result of S74 is negative, but the applicable embodiment is not limited thereto. For example, the process of S74 may be performed when the determination result of S78 is negative.

In FIG. 5, the process of S112 is performed when the determination result of S96 is negative, but the applicable embodiment is not limited thereto. For example, the process of S96 may be performed when the determination result of S112 is negative.

What is claimed is:

1. A misfire detection device for an internal combustion engine, the misfire detection device being applied to an internal combustion engine including a plurality of cylinders, the misfire detection device being configured to perform:

a stopping process of stopping combustion control of an air-fuel mixture in some cylinders out of the plurality of cylinders;

a temporary determination process of temporarily determining whether a misfire has occurred based on a magnitude of an amount of rotational fluctuation of a crank shaft;

a regular determination process of regularly determining that a misfire has occurred when a proportion at which it has been temporarily determined that a misfire has occurred is equal to or greater than a predetermined proportion; and a return determination process of determining that the internal combustion engine has returned to a normal state when the proportion at which it has been temporarily determined that a misfire has occurred is equal to or less than a prescribed proportion after the regular determination has been performed, wherein the amount of rotational fluctuation is a rate of change of an instantaneous speed variable, wherein the instantaneous speed variable is a variable indicating a speed when the crank shaft rotates, and wherein the return determination process is a process of adding that the stopping process is being performed to an input for determining that the internal combustion engine has returned to the normal state when it is regularly determined in the regular determination process that a misfire has occurred based on the result of the temporary determination in a period in which the stopping process is being performed.

2. The misfire detection device for an internal combustion engine according to claim 1, wherein the misfire detection device is configured to further perform a storage process of storing a designation variable for designating the determination result of the temporary determination process which is added to the input of the return determination process based on a state when it has been regularly determined that a misfire has occurred, wherein the designation variable is a variable for designating the determination result of the temporary determination process in a period in which the stopping process is not being performed when a period in which the temporary determination process of which the determination result is input to the regular determination process has been performed is a period in which the stopping process is not being performed and designating the determination result of the temporary determination process in a period in which the stopping process is being performed when the period in which the temporary determination process of which the determination result is input to the regular determination process has been performed is included in the period in which the stopping process is being performed, and wherein the return determination process is a process of determining that the internal combustion engine has returned to the normal state based on the determination result of the temporary determination process designated by the designation variable.

3. The misfire detection device for an internal combustion engine according to claim 1, wherein the misfire detection device is configured to further perform a storage process of storing a designation variable for designating the determination result of the temporary determination process which is added to the input of the return determination process based on a state when it has been regularly determined that a misfire has occurred,
- wherein the regular determination process is a process of regularly determining that a misfire has occurred based on the determination result of the temporary determination process in a predetermined period, and
- wherein the designation variable is a variable for designating the determination result of the temporary determination process in a period in which the stopping process is not being performed when it has been regularly determined that a misfire has occurred because a proportion at which the temporary determination process has been performed in the predetermined period including both a period in which the stopping process is being performed and a period in which the stopping process is not being performed is equal to or greater than the predetermined proportion and a proportion at which the temporary determination process has been performed in the period in which the stopping process is not being performed out of the number of times the temporary determination process has been performed is equal to or greater than the predetermined proportion.

4. The misfire detection device for an internal combustion engine according to claim 1, wherein the misfire detection device is configured to further perform a storage process of storing a designation variable for designating the determination result of the temporary determination process which is added to the input of the return determination process based on a state when it has been regularly determined that a misfire has occurred,
- wherein the regular determination process is a process of regularly determining that a misfire has occurred based on the determination result of the temporary determination process in a predetermined period, and
- wherein the designation variable is a variable for designating the determination result of the temporary determination process in a period in which the stopping process is being performed when it has been regularly determined that a misfire has occurred because a proportion at which the temporary determination process has been performed in the predetermined period including both a period in which the stopping process is being performed and a period in which the stopping process is not being performed is equal to or greater than the predetermined proportion and a proportion at which the temporary determination process has been performed in the period in which the stopping process is being performed out of the number of times the temporary determination process has been performed is equal to or greater than the predetermined proportion.

5. The misfire detection device for an internal combustion engine according to claim 1, wherein the misfire detection device is configured to further perform a storage process of storing a designation variable for designating the determination result of the temporary determination process which is added to the input of the return determination process based on a state when it has been regularly determined that a misfire has occurred,
- wherein the regular determination process is a process of regularly determining that a misfire has occurred based on the determination result of the temporary determination process in a predetermined period, and
- wherein the designation variable is a variable for designating the determination result of the temporary determination process in both a period in which the stopping process is not being performed and a period in which the stopping process is being performed when it has been regularly determined that a misfire has occurred because a proportion at which the temporary determination process has been performed in the predetermined period including both the period in which the stopping process is being performed and the period in which the stopping process is not being performed is equal to or greater than the predetermined proportion and both a proportion at which the temporary determination process has been performed in the period in which the stopping process is not being performed out of the number of times the temporary determination process has been performed and a proportion at which the temporary determination process has been performed in the period in which the stopping process is being performed are less than the predetermined proportion.

6. A misfire detection device for an internal combustion engine, the misfire detection device being applied to an internal combustion engine including a plurality of cylinders, the misfire detection device being configured to perform:
- a stopping process of stopping combustion control of an air-fuel mixture in some cylinders out of the plurality of cylinders;
- a temporary determination process of temporarily determining whether a misfire has occurred based on a magnitude of an amount of rotational fluctuation of a crank shaft;
- a regular determination process of regularly determining that a misfire has occurred when a proportion at which it has been temporarily determined that a misfire has occurred is equal to or greater than a predetermined proportion;
- a return determination process of determining that the internal combustion engine has returned to a normal state when the proportion at which it has been temporarily determined that a misfire has occurred is equal to or less than a prescribed proportion after the regular determination has been performed, and
- a storage process of storing a designation variable for designating the determination result of the temporary determination process which is added to the input of the return determination process based on a state when it has been regularly determined that a misfire has occurred,
- wherein the designation variable is a variable for designating the determination result of the temporary determination process in a period in which the stopping process is not being performed when a period in which the temporary determination process of which the determination result is input to the regular determination process has been performed is a period in which the stopping process is not being performed and designating the determination result of the temporary determination process in a period in which the stopping process is being performed when the period in which the temporary determination process of which the determination result is input to the regular determination process has been performed is included in the period in which the stopping process is being performed, wherein the return determination process is a process of determining that the internal combustion engine has returned to the normal state based on the determination result of the temporary determination process designated by the designation variable, wherein the amount of rotational fluctuation is a rate of change of an instantaneous speed variable, wherein the instantaneous speed variable is a variable indicating a speed when the crank shaft rotates, wherein the return determination process is a process of not adding a determination result of the temporary determination process in a period in which the stopping process is being performed to an input for determining that the internal combustion engine has returned to the normal state when it is regularly determined in the regular determination process that a misfire has occurred based on the result of the temporary determination in a period in which the stopping process is not being performed, and wherein the designation variable designates a same subarea as a subarea in which it has been regularly determined that a misfire has occurred out of a plurality of subareas into which an area is divided by at least one of a filling efficiency of the internal combustion engine, a rotation speed of a crank shaft, and a temperature of the internal combustion engine.

7. The misfire detection device for an internal combustion engine according to claim 2, wherein the internal combustion engine includes a filter that collects particulate matter in exhaust gas in an exhaust passage, and wherein the misfire detection device is configured to further perform a regeneration process including a process of causing an air-fuel ratio in a cylinder other than the some cylinders to be richer than a stoichiometric air-fuel ratio and the stopping process when an amount of particulate matter collected by the filter is equal to or greater than a predetermined amount.

* * * * *